Feb. 21, 1939.  H. F. TÖNNIES  2,147,999
EXPOSURE METER
Filed March 24, 1937

Inventor:
Hans F. Tönnies,
By Potter, Pierce & Scheffler,
Attorneys

Patented Feb. 21, 1939

2,147,999

UNITED STATES PATENT OFFICE 2,147,999

EXPOSURE METER

Hans Ferdinand Tönnies, Hamburg-Grossflottbek, Germany

Application March 24, 1937, Serial No. 132,863
In Germany June 6, 1935

8 Claims. (Cl. 88—23)

This invention relates to exposure meters and more particularly to exposure meters including photoelectric apparatus for measuring the brightness value of a scene to be photographed and auxiliary devices for determining the desired final values or exposure data (time of exposure and diaphragm opening) from the measured brightness value.

Tables or tabulations of exposure data may be employed to ascertain the final values corresponding to a particular brightness value, but the usual practice is to employ some form of rotary disk computer for determining the exposure data from the emulsion speed, the measured brightness and/or the character of the scene. An error in the transfer of the instrument reading to a tabulation or computer will result in a faulty indication of the exposure data.

An object of the present invention is to provide an exposure meter of the photoelectric measuring system and computer type, in which the measuring instrument and computer elements are so positioned that the instrument pointer serves as a mark for indicating the appropriate adjustment of one computer element. An object is to provide an exposure meter of the type stated in which a movable element of the computer carries a mark or pointer that is movable along the instrument scale, the computer elements having cooperating graduations of exposure factors for indicating complementary shutter speed and diaphragm values for a given deflection of the instrument pointer when the mark of the computer element is alined with the deflected pointer. An object is to provide an exposure meter including a photoelectric cell and an instrument having a pointer displaceable in accordance with the brightness of a scene to be photographed, and three relatively movable elements carrying scales or graduations of exposure factors; one of the movable elements carrying a mark for alinement with the deflected instrument pointer to set the elements into position to indicate the appropriate exposure data. A further object is to provide an exposure meter having the characteristics last stated, in which the instrument scale forms, in effect, a part of the computer and may comprise a series of lines extending between the path of movement of the instrument pointer and the path of movement of the mark carried by one of the computer elements.

These and other objects and advantages of the invention will be apparent from the following specification when taken with the accompanying drawing, in which.

Figure 1:
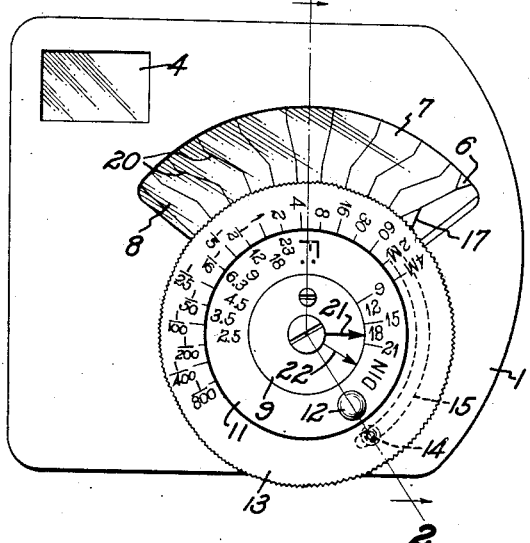
Fig. 1 is a rear elevation of an embodiment of the invention.

In the drawing, the reference numeral 1 identifies the casing which houses a photoelectric cell 2 that is positioned back of the baffle system 3 which restricts the light rays which reach the cell to those reflected from the scene or object to be photographed. The casing may have an opening therethrough in which a view finder 4 is arranged for facilitating the directing of the exposure meter towards the scene. The cell 2 is connected in known manner to the coil of the moving system of a sensitive milliammeter 5 that is housed within the casing 1. The moving system includes a pointer or needle 6 that, preferably, is reversely bent at its outer end to overlie a scale plate 7 that is visible through a window 8 at the rear face of the casing 1.

The computer system for indicating the exposure data appropriate for a given deflection of the instrument pointer 6 comprises a plurality of relatively rotatable disks adjustable about an axis concentric with the axis of the movable system of the measuring instrument. The inner disk 9 may be integral with the casing 1 or secured thereto by a screw 10, an intermediate disk 11 is rotatably mounted on disk 9 and carries a knob 12 for adjusting the same, and the outer disk 13 is rotatable on disk 11 and, preferably, has a knurled edge projecting below the casing 1 to facilitate its adjustment. A pin 14 extends through an arcuate slot 15 in casing 1 to connect the computer disk 13 to a plate or strip 16 that has a pointer or fiducial mark 17 movable over the inner edge of the scale plate 7. The plate 16 is pivotally supported on a bolt 18 that extends axially through the disks and casing, and a spring arm 19 is fixed to the plate 16 and bears against the inner face of the casing to provide a limited frictional resistance to rotation of disk 13 and plate 16.

The usual numeral markings may be placed on the scale plate 7 but the only essential markings consist in a series of approximately radial guide lines 20 for indicating the appropriate angular adjustment of the disk 13 of the computer for any given deflection of the instrument pointer 6. The departure of lines 20 from an exact radial location depends upon the sensitivity characteristics of the measuring instrument and the arrangement of the graduations upon the computer disks.

It will be understood that the cooperating sets of exposure data values may be arranged on the several disks in different ways. As shown in Fig. 1, the outer or adjustable disk 13 carries graduations of time of exposure, the intermediate disk 11 carries a cooperating scale of diaphragm openings and a scale of emulsion speeds in "Din" values. The fixed disk 9 has two marks 21, 22 cooperating with the emulsion speed graduations to indicate the adjustment for different films or plates under solar and artificial illumination, respectively.

Figure 2:
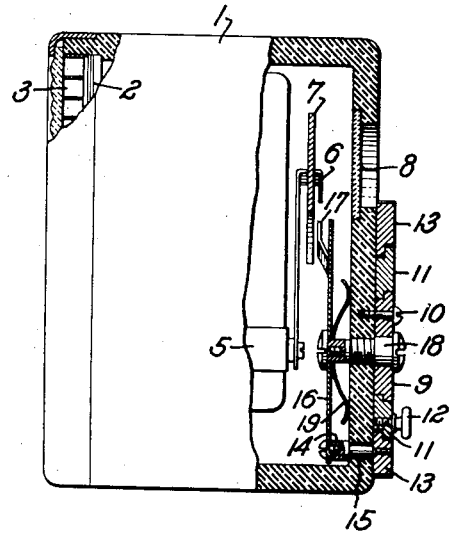
Fig. 2 is a side elevation with parts in section as taken on line 2—2 of Fig. 1.

The adjustment of the intermediate disk 11 is a relatively fixed adjustment as it remains constant for any one type of film or plate. Only the disk 13 need be adjusted to obtain the desired final values corresponding to a given instrument indication and appropriate means is provided for creating a greater frictional resistance to movement of disk 11 than of disk 13. These graduated frictional resistances may be provided, as indicated in Fig. 2, for example by a tight fit of disks 9 and 11, and a relatively loose fit of disks 11 and 13.

The method of employing the apparatus will now be described. The disk 11 is first adjusted to aline the particular emulsion speed graduation of that disk with the appropriate mark 21 or 22 of disk 9. The front of the exposure meter is then directed towards the scene, and the disk 13 is angularly adjusted to bring the mark 17 to that line 20 of the scale plate to which the instrument pointer 6 is deflected. The cooperating graduations of diaphragm openings and shutter speeds of disks 11 and 13 are thus alined to indicate exposure data appropriate for the measured brightness of the scene to be photographed.

It is to be noted that the fiducial mark 17 could be placed directly upon the disk 13, but the described arrangement of the fiducial mark 17 in the plane of the instrument pointer 6 is to be preferred since it avoids errors from parallax when the scale plate and pointers are viewed at an angle.

Figure 3:
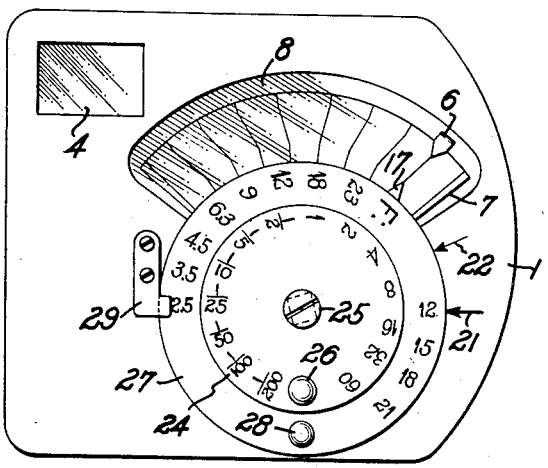
Fig. 3 is a rear elevation of another embodiment of the invention.
Figure 4:
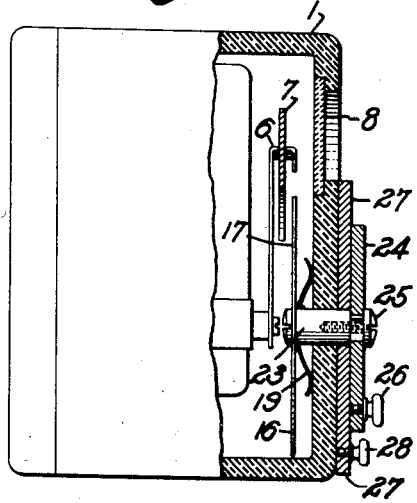
Fig. 4 is a fragmentary sectional view of the computer elements thereof.

In the modification shown in Figs. 3 and 4, those parts which are or may be identical with the described construction are identified by corresponding reference numerals but will not be described in detail. This embodiment includes a rotatable staff 23 coaxial with the moving system of the instrument and having secured thereto the inner disk 24 of the computer and the disk 16 which carries the fiducial mark 17. The outer end of the staff 23 is of non-circular cross-section, preferably square, and the disk 24 is fitted thereon and secured thereto by a screw 25. The disk 24 has a knob 26 for rotating the same with reference to the underlying disk 27 that has an adjusting knob 28. A spring finger 29 is secured to the casing 1 and engages the disk 26 to create a frictional resistance greater than that which tends to prevent angular adjustment of the disk 24.

Fiducial marks 21, 22 are provided on the casing 1 to cooperate with an emulsion speed scale on disk 27 for indicating adjustments appropriate, respectively, for solar or artificial illumination. The disk 27 also carries diaphragm opening graduations for cooperation with shutter speed graduations on the adjustable disk 24.

The operation of this form of the invention will be obvious from the description of the exposure meter shown in Figs. 1 and 2.

It will be seen that the invention eliminates the possibility of error in the setting of a calculator element in accordance with the observed deflection of the instrument pointer. I have described preferred embodiments of the invention but it is to be understood that the structural design is subject to wide variation and that the particular exposure factors that are placed upon the several scales may be interchanged without departing from the spirit of my invention as set forth in the following claims.

I claim:

1. In an exposure meter; a measuring instrument having a pivotally supported moving system, a pointer carried by said moving system and a scale plate; a casing for said instrument having an opening for viewing said scale plate and pointer; a photoelectric cell connected to said instrument; a relatively fixed and a movable disk forming a computer, and means supporting said disks upon said casing adjacent said window, said disks having cooperating graduations of exposure time and diaphragm openings; and a member within said casing carrying a fiducial mark, and means connecting said member to said movable disk for effecting movement of said member to displace said fiducial mark into alinement with said instrument pointer.

2. An exposure meter as claimed in claim 1, wherein said scale plate has guide lines thereon for alining the fiducial mark with said pointer, and said fiducial mark and instrument pointer move in substantially the same plane.

3. An exposure meter as claimed in claim 1, wherein said scale plate is positioned between said moving system and the window, the end of said pointer extending beyond and being reversely bent to overlie the outer edge of the scale plate, and said fiducial mark is pivotally supported within said casing and movable in the plane of movement of the end of the instrument pointer.

4. An exposure meter comprising a measuring instrument having a scale plate and a cooperating pointer supported for pivotal movement about an axis, a casing for housing said instrument and having a window for viewing said scale plate and pointer, said pointer extending beneath and beyond said scale plate with the outer end thereof reversely bent to travel over the outer edge of the scale plate, guide lines extending approximately radially across said scale plate, and a computer carried by said casing; said computer including a relatively fixed and a movable disk coaxial with the axis of said pointer, cooperating exposure factor graduations on said disks, and member within said casing and secured to said movable disk, said member carrying a fiducial mark displaceable along the inner ends of the guide lines of said scale plate.

5. An exposure meter as claimed in claim in combination with means supporting said relatively fixed disk for angular adjustment on said casing, and cooperating sets of markings setting said relatively fixed disk to positions corresponding to emulsion speeds, one set of markings being stationary with respect to said casing and the other set being on said relatively fixed disk.

6. An exposure meter as claimed in claim wherein said movable disk is the inner disk said computer, and friction means is provi for opposing angular movement of the outer disk, in combination with a mark on the casing, and a cooperating set of graduations of emulsion speeds on said outer disk.

7. In photoelectric apparatus for determining exposure conditions, a measuring instrument having a pointer and a scale bearing approximately radial guide lines, a casing housing said instrument and having an opening for viewing said scale and pointer, a pair of concentric disks supported on said casing for angular adjustment, cooperating graduations of diaphragm openings and exposure times on said disks, a single fiducial mark secured to one of said disks and movable thereby along said scale, a cooperating setting mark and film speed scale carried by said casing and the second disk, and friction means tending to prevent angular adjustment of the second disk with respect to said casing.

8. Apparatus as claimed in claim 7, wherein said disks are of different diameter, and said fiducial mark is carried by the larger diameter disk.

HANS FERDINAND TÖNNIES.